United States Patent
Lai

(10) Patent No.: US 12,046,248 B2
(45) Date of Patent: Jul. 23, 2024

(54) AUDIO PACKET LOSS CONCEALMENT VIA PACKET REPLICATION AT DECODER INPUT

(71) Applicant: GOOGLE LLC, Mountain View, CA (US)

(72) Inventor: Chiong Ching Lai, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/770,196

(22) PCT Filed: Dec. 7, 2020

(86) PCT No.: PCT/US2020/063618
§ 371 (c)(1),
(2) Date: Apr. 19, 2022

(87) PCT Pub. No.: WO2021/201926
PCT Pub. Date: Oct. 7, 2021

(65) Prior Publication Data
US 2022/0392459 A1    Dec. 8, 2022

Related U.S. Application Data

(60) Provisional application No. 63/003,370, filed on Apr. 1, 2020.

(51) Int. Cl.
*G10L 19/005*     (2013.01)
*G10L 19/16*      (2013.01)

(52) U.S. Cl.
CPC .......... *G10L 19/005* (2013.01); *G10L 19/167* (2013.01)

(58) Field of Classification Search
CPC .................................................. G10L 19/005
See application file for complete search history.

(56) References Cited

U.S. PATENT DOCUMENTS 10,037,761 B1 *  7/2018  Park ................... G10L 19/005
10,320,693 B2 *  6/2019  Yu ..................... H04L 43/022
(Continued)

FOREIGN PATENT DOCUMENTS

| JP | H05-316054 A | 11/1993 |
| JP | 2007-010855 A | 1/2007 |
| JP | 2013-178554 A | 9/2013 |

OTHER PUBLICATIONS

International Preliminary Report on Patentability mailed Oct. 13, 2022 for corresponding International Application No. PCT/US2020/063618, 7 pages.

(Continued)

*Primary Examiner* — Douglas Godbold

(57) ABSTRACT

A system includes a server to generate a real-time stream of audio packets and a client device to decode and playback the audio content of the stream. The client device includes a network interface configured to receive a stream of audio packets via a network and a buffer configured to temporarily buffer a subset of audio packets of the stream. The client device further includes an audio decoder having an input to receive audio packets from the buffer and an output to provide corresponding segments of a decoded audio data stream. The client device also includes a stream monitoring module configured to provide an audio packet of the subset in the buffer which was previously decoded by the decoder to the input of the decoder again for a repeated decoding in place of a decoding of an audio packet that is lost or late.

20 Claims, 3 Drawing Sheets

(56) References Cited

U.S. PATENT DOCUMENTS

| | | | | |
|---|---|---|---|---|
| 2002/0133764 | A1* | 9/2002 | Wang | G10L 19/005 |
| | | | | 714/707 |
| 2005/0049853 | A1* | 3/2005 | Lee | G10L 19/005 |
| | | | | 704/201 |
| 2009/0006084 | A1* | 1/2009 | Chen | G10L 19/005 |
| | | | | 704/211 |
| 2009/0037168 | A1* | 2/2009 | Gao | G10L 19/005 |
| | | | | 704/219 |
| 2017/0245172 | A1* | 8/2017 | Yoon | H04W 28/04 |
| 2019/0066699 | A1* | 2/2019 | Norton | G10L 19/022 |
| 2019/0081719 | A1* | 3/2019 | Huang | H04L 47/30 |
| 2019/0268250 | A1* | 8/2019 | Caron | G10L 19/22 |
| 2020/0020342 | A1* | 1/2020 | Tiwari | H04L 65/764 |
| 2020/0219519 | A1* | 7/2020 | Wang | G10L 19/18 |

OTHER PUBLICATIONS

International Search Report and Written Opinion mailed Mar. 15, 2021 for corresponding International Application No. PCT/US2020/063618, 14 pages.

Broadcom: Whitepaper, "Improving the Quality of Communications with Packet Loss Concealment", Sep. 2008, 14 pages.

Translation of Japanese Office Action mailed Sep. 5, 2023 for JP Application No. 2022520308, 8 pages.

Translation of Japanese Office Action mailed Mar. 5, 2024 for JP Application No. 2022520308, 2 pages.

European Office Action mailed May 6, 2024 for EP Application No. 20829475.1, 5 pages.

Perkins et al., "A Survey of Packet Loss Recovery Techniques for Streaming Audio", IEEE Network, IEEE Service Center, New York, NY, US, vol. 12, No. 5, Sep. 1, 1998, 9 pages.

* cited by examiner

AUDIO PACKET LOSS CONCEALMENT VIA PACKET REPLICATION AT DECODER INPUT

CROSS-REFERENCE TO RELATED APPLICATIONS

The present application is a U.S. National Stage under 35 U.S.C. § 371 of International Patent Application Serial No. PCT/US2020/063618, entitled "AUDIO PACKET LOSS CONCEALMENT VIA PACKET REPLICATION AT DECODER INPUT" and filed on Dec. 7, 2020, which claims priority to U.S. Provisional Application No. 63/003,370, entitled "AUDIO PACKET LOSS CONCEALMENT VIA PACKET REPLICATION AT DECODER INPUT" and filed on Apr. 1, 2020, the entireties of which are incorporated by reference herein.

BACKGROUND

Real-time media streaming services often are susceptible to network issues, such as packet loss or otherwise delayed packets. For audio streams, the loss or late arrival of an audio packet can be problematic because the audio decoder at the receiving client device typically cannot simply pause audio playback as this will degrade the audio quality and thus impact the quality of service. To mitigate the impact of late/lost audio packets, many systems employ a conventional packet loss concealment (PLC) technique, such as forward error correction (FEC), silence insertion, interpolative analysis, or post-decoding segment replication.

Typically, FEC-based PLC techniques rely on the transmission of an increased number of at least partially redundant packets, with this redundancy allowing the client device to reconstruct a lost or late audio packet. However, this redundancy consumes extra bandwidth and thus often reduces the overall bitrate of the audio stream. Moreover, this approach is limited to only those client devices that have built-in FEC capabilities. Silence insertion techniques, in effect, provide either zero output or a default defined output for a time slot corresponding to a lost/late audio packet. While relatively simple to implement, this default insertion often introduces perceptible audio artifacts. In contrast, interpolative analysis-based techniques, which analyze the prior audio signal and attempt to reconstruct the content of the lost/late packet through signal estimation, can provide improved audio signal replication and thus fewer perceptible audio artifacts. Post-decoding replication techniques rely on replication of a slice of the audio output of the audio decoder to compensate for a late/lost audio packet, along with additional processing to analyze the reconstructed audio signal and effectively "stitch" it together in a manner that reduces audio artifacts. However, while post-decoding replication techniques and interpolative analysis techniques may provide improved signal fidelity, these techniques often require a complexity and compute resource capability that is impracticable for many client devices.

SUMMARY OF EMBODIMENTS

In a first embodiment an electronic device includes a network interface configured to receive a stream of audio packets via a network, a buffer configured to temporarily buffer a subset of audio packets of the stream, and an audio decoder having an input to receive audio packets from the buffer and an output to provide corresponding segments of a decoded audio data stream (i.e., segments whose decoded audio data respectively corresponds to an audio packet from the buffer). The electronic device further includes a stream monitoring module configured to provide an audio packet of the subset in the buffer that was previously decoded by the decoder to the input of the decoder again for a repeated decoding in place of a decoding of an audio packet that is lost or late. The stream monitoring module can be configured to provide a packet loss concealment (PLC) process by providing the audio packet which was previously decoded by the decoder to the input of the decoder again for a repeated decoding, further responsive to determining that a number of times that the audio packet has been decoded in a row has not exceeded a specified threshold, and further may be configured to trigger a fault responsive to the number of times that an audio packet has been decoded in a row has exceeded the specified threshold. The stream monitoring module also can be further configured to implement an alternative packet loss concealment (PLC) process for compensating for an audio packet that is lost or late responsive to the number of times that an audio packet has been decoded in a row has exceeded the specified threshold.

Triggering a fault may included triggering generation of a fault signal, e.g., a fault signal resulting in a stop of playback of the audio stream (and, in an exemplary embodiment, also of a corresponding video stream if there is one) and/or in initiating a system performance check.

A proposed electronic device may thus include a network interface to receive the audio stream from a network, a buffer, e.g., a jitter buffer, to temporarily buffer a subset of the audio packets as they are received at the electronic device, and an audio decoder to decode audio packets from the buffer to generate corresponding segments of a decoded audio signal. The decoded audio signal can then be mixed with other audio sources, repacketized and further transmitted, or otherwise further processed to ultimately generate one or more analog audio, signals used to drive one or more corresponding speakers. In at least one embodiment, the electronic device may employ the proposed packet loss concealment (PLC) technique based on one or more repeat decodings of a previously received audio packet to compensate for one or more subsequent audio packets that have been lost or excessively delayed (that is, "late") by the network. To this end, the electronic device may employ the stream monitoring module to monitor the received audio stream to detect when an audio packet of the stream is, late or lost. In response to detecting such a late or lost audio packet, the stream monitoring module provides an audio packet of the subset in the buffer which was previously decoded by the decoder for a previous time slot to the input of the decoder again for a repeated decoding for the current time slot in place of a decoding of the audio packet that is lost or late and which was intended for the current time slot. By repeating the decoding of a previously-decoded audio packet to fill in the gap caused by the late/lost packet, this PLC technique leverages the decoder's audio synthesis (by following a typical decoding processing path) to facilitate the continuity of the decoded audio signal during packet decoding replication, and thus reducing or eliminating the distortion or artifacts that otherwise would occur in the absence of this continuity.

In an example embodiment, the stream monitoring module can be configured to, for a first audio packet timely received at the electronic device, provide the first audio packet to the audio decoder for decoding into a corresponding first segment of a decoded audio signal for a first time slot; for a second audio packet that is late or lost, provide the first audio packet to the audio decoder for decoding into a corresponding second segment of the decoded audio signal for a second time slot; and wherein the second segment has continuity with the first segment. The stream monitoring module also can be further configured to, for a third audio packet that is late or lost, provide the first audio packet to the audio decoder for decoding into a corresponding third segment of the decoded audio signal for a third time slot; and wherein the third segment has continuity with the second segment.

In any of the above instances, the stream of audio packets can be generated from audio content generated by a video game application executed at a server connected to the electronic device via the network.

Other embodiments may include a method of operating the electronic device of any of the instances described above, as well as a system including a server to generate the stream of audio packets and the electronic device of any of the instances described above.

In another embodiment, a proposed computer-implemented method includes receiving a stream of audio packets from a network, temporarily buffering a subset of the audio packets, decoding, at an audio, decoder, a first audio packet of the subset to generate a first segment of a decoded audio data stream, and responsive to detecting that a second audio packet following the first audio packet in the stream is lost or late, decoding, at the audio decoder, the first audio packet again to generate a second segment of the decoded audio signal, the second segment following the first segment in the decoded audio signal. The method also can include, responsive to detecting that a third audio packet following the second audio packet in the stream is lost or late, decoding, at the audio decoder, the first audio packet a third time to generate a third segment of the decoded audio signal, the third segment following the second segment in the decoded audio signal. Decoding the first audio packet again can be further responsive to determining that a number of times that the first audio packet has been decoded in a row has not exceeded a specified threshold. The method further can include triggering a fault responsive to the number of times that the first audio packet has been decoded in a row has exceeded the specified threshold. The method also can further include implementing an alternative packet loss concealment process for compensating the second audio packet being lost or late responsive to the number of times that the first audio packet has been decoded in a row has exceeded the specified threshold. In any of the above-described instances, the audio decoder can generate the second segment to have continuity with the first segment. Likewise, in any of the above-described instances, the stream of audio packets can be generated from audio content generated by a video game application executed at a server.

Other embodiments may include an electronic device comprising a buffer to buffer audio packets and a decoder to decode audio packets, the electronic device configured to perform the example method.

Another embodiment includes a non-transitory computer-readable medium storing a set of executable instructions configured to manipulate a processor to decode a first audio packet of a temporarily-buffered subset of audio packets of a stream received via a network to generate a first segment of a decoded audio signal, and responsive to detecting that a second audio packet following the first audio packet in the stream is lost or late, decoding, at the audio decoder, the first audio packet again to generate a second segment of the decoded audio signal, the second segment following the first segment in the decoded audio signal and having continuity with the first segment.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
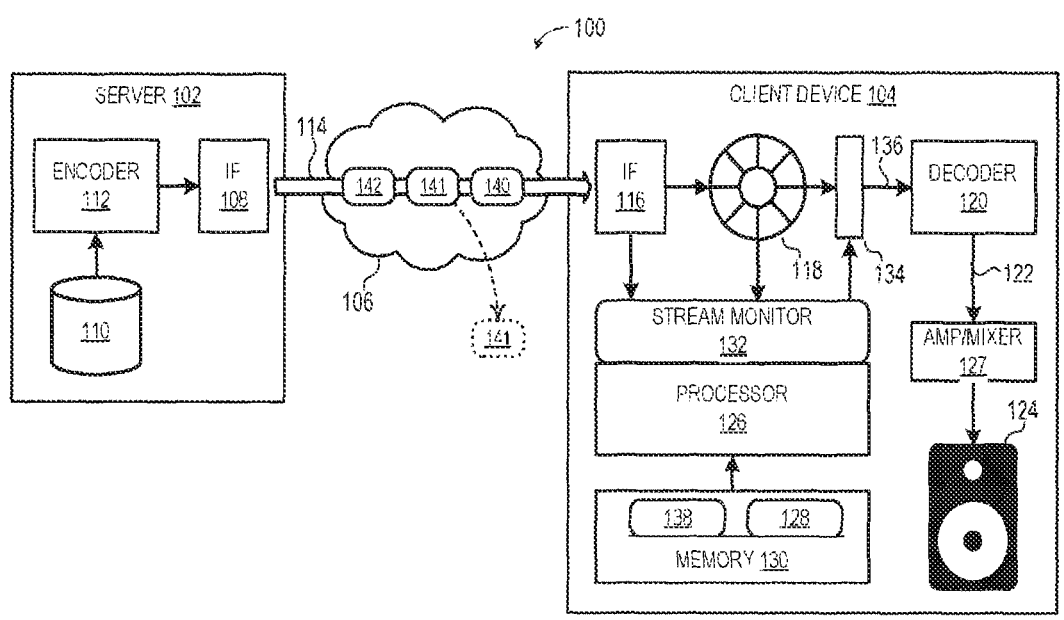
FIG. 1 is a block diagram illustrating a real-time media streaming system employing packet loss concealment (PLC) based on pre-decoder packet replication in accordance with some embodiments.
Figure 2:
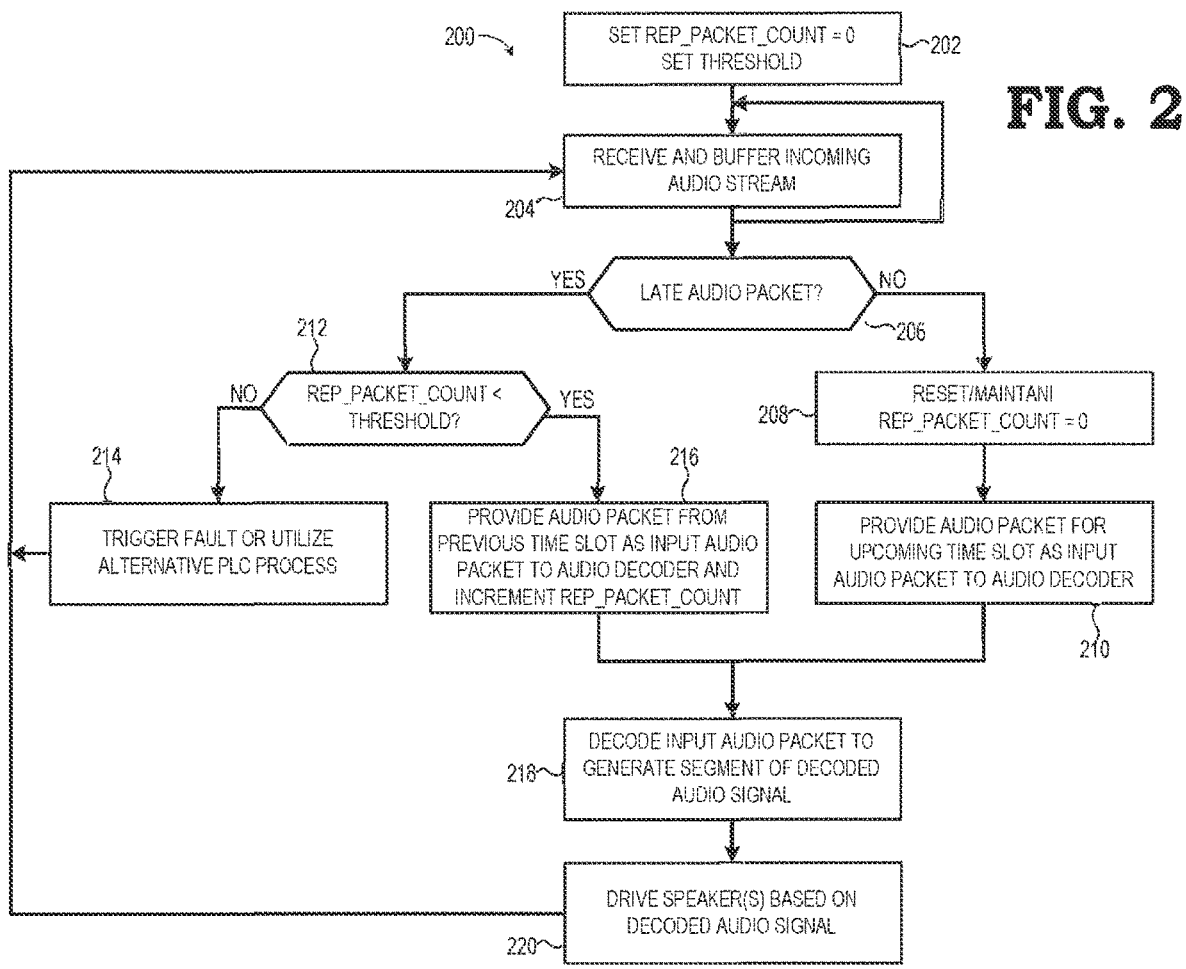
FIG. 2 is a flow diagram illustrating a method for PLC using pre-decoder packet replication in accordance with some embodiments.
Figure 3:
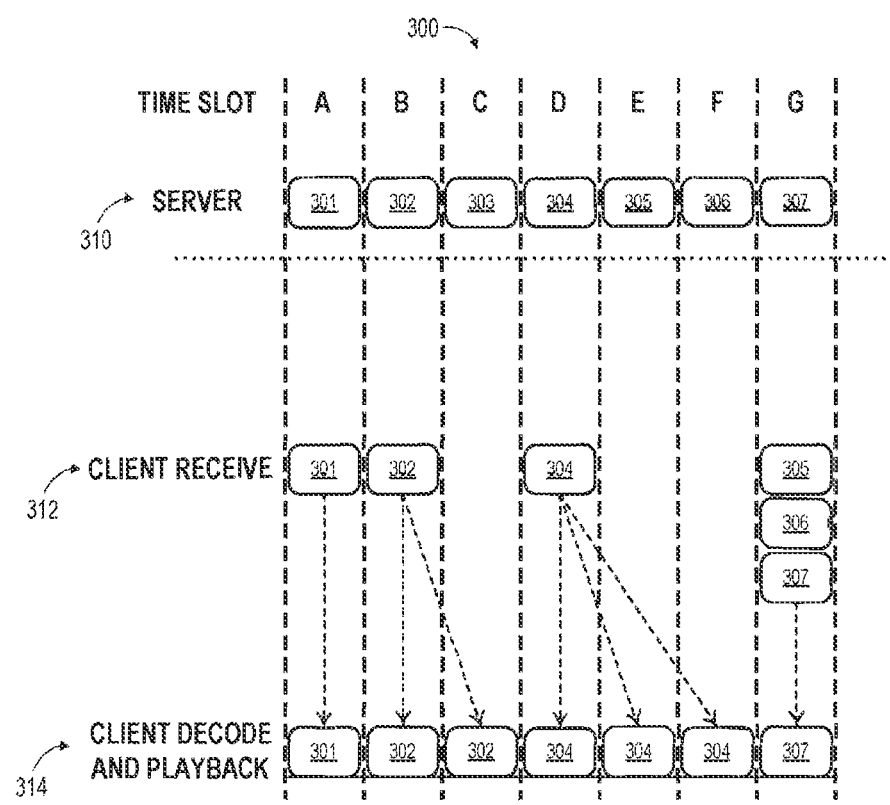
FIG. 3 is a diagram illustrating an example implementation of the method of FIG. 2.

FIGS. 1-3 illustrate various systems and techniques for mitigating the impact of packet loss or packet delays in a real-time audio stream transmitted from a server to a user's electronic device (that is, "client device") via one or more networks. The client device includes a network interface to receive the audio stream from a network, a jitter buffer to temporarily buffer a subset of the audio packets as they are received at the client device, and an audio decoder to decode audio packets from the jitter buffer to generate corresponding segments of a decoded audio signal. For example, the decoded audio signal can then be mixed with other audio sources, repacketized and further transmitted, or otherwise further processed to ultimately generate one or more analog audio signals used to drive one or more corresponding speakers. In at least one embodiment, the client device employs a packet loss concealment (PLC) technique based on one or more repeat decodings of a previously received audio packet to compensate for one or more subsequent audio packets that have been lost or excessively delayed (that is, "late") by the network. To this end, the client device employs a stream monitoring module to monitor the received audio stream to detect when an audio packet of the stream is late or lost. In response to detecting such a late or lost audio packet, the stream monitoring module provides an audio packet of the subset in the buffer which was previously decoded by the decoder for a previous time slot to the input of the decoder again for a repeated decoding, for the current time slot in place of a decoding of the audio packet that is lost or late and which was intended for the current time slot. By repeating the decoding of a previously-decoded audio packet to fill in the gap caused by the late/lost packet, this PLC technique leverages the decoders audio synthesis (by following a typical decoding processing path) to facilitate the continuity of the decoded audio signal during packet decoding replication, and thus reducing or eliminating the distortion or artifacts that otherwise would occur in the absence of this continuity.

FIG. 1 illustrates, a real-time media streaming system 100 employing a PLC technique using pre-decoder packet replication in accordance with some embodiments. The system 100 includes a server 102 coupled to a user's electronic device 104 (hereinafter, "client device 104") via one or more networks 106. The one or more networks 106 can include, for example, the Internet or other public-access network, wired or wireless wide area network (WAN), wired or wireless local area network (LAN), wired or wireless personal area network (PAN), or combinations thereof.

The server 102 includes a network interface 108 coupled to the network 106, a real-time media source 110, and an audio encoder 112. The real-time media source 110 generates or otherwise provides real-time media content for transmission to the client device 104. To illustrate, the real-time media source 110 can include, for example, a cloud-based video game being executed at the server 102 based on player inputs received from the client device 104 via the network 106, with the video game generating both a stream of video frames and a stream of accompanying audio frames for transmission to the client. As another example, the real-time media source 110 can include a video conferencing application that distributes video and audio streams among the various participant's client devices. As yet another example, the real-time media source 110 can include the forwarding transmission of the voice content of a Voice-over-internet Protocol (VoIP) or other packet-based voice call in a mobile cellular system. The audio encoder 112 operates to encode the audio content stream from the real-time media source 110 and provide the resulting encoded audio stream to the network interface 108, whereupon the network interface 108 packetizes the encoded audio stream and transmits the resulting audio packets to the client device 104 via the network 106 as part of a packetized audio stream 114.

The client device 104 represents any of a variety of electronic devices utilized to playback the audio content of the audio stream 114, or to decode and forward the audio content for playback by yet another electronic device. Examples of the client device 104 include a mobile telephone, a desktop computer, a laptop computer, a tablet computer, a game console, a "smart" television, a "smart" watch, an automotive informational/entertainment system, and the like. The client device 104 includes a network interface 116 to receive the audio packets of the audio stream 114, a jitter buffer 118 (e.g., a circular buffer) to temporarily buffer a sliding subset of the recently received audio packets, and an audio decoder 120 that operates to sequentially decode audio packets from the jitter buffer 118 in a specified order (e.g., received order, sequential order based on time stamp, etc.) to generate a corresponding decoded audio segment of an output decoded audio signal 122 (e.g., a pulse-code-modulation (PCM) digital signal) that can be either directly converted to one or more analog audio signals used to drive at least one speaker 124 (e.g., via a digital-to-analog converter, or DAC) or processed further, such as by a digital amplifier/mixer 127, before being converted to one or more analog speaker signals for driving the at least one speaker 124. In one embodiment, the audio decoder 120 is implemented as one or more processors 126 executing audio decoding software 128 stored in system memory 130 or other non-transitory computer-readable medium. To illustrate, the audio decoding software 128 can be implemented as, for example, an Opus Interactive Audio Codec or other well-known or proprietary software-based codec. In other embodiments, the audio decoder 120 can be implemented as hardcoded or programmable logic, such as an application-specific integrated circuit (ASIC) or field-programmable gate array (FPGA) configured to perform the functionality described herein. In still other embodiments, the audio decoder 120 can be implemented as a combination of a processor executing software and specific hardcoded/programmable logic.

In at least one embodiment the network 106 is a combination of one or more packet-switched networks, and thus is subject to congestion, routing errors, buffer overflows, and other network issues that can result in one or more of the audio packets of the audio stream 114 being lost (that is, never received by the client device 104) or late (that is, not received by the client device 104 in time to be processed for playback in its corresponding decoding timeslot). As a late audio packet has the same result as a lost audio packet in that neither can be used to provide the playback of the represented audio content in the corresponding time slot and therefore is effectively "lost" unless otherwise noted reference to a "lost audio packet" herein is intended to include either an audio packet lost in the network 106 or an audio packet that arrived too late at the client device 104. Without a compensating mechanism, a lost audio packet means that the audio decoder 120 will not have the intended audio content to decode to generate a corresponding segment of the decoded audio signal 122 for the corresponding time slot, and thus introducing a significant discontinuity in the resulting decoded audio signal 122 that will detract from the listener's experience. While conventional PLC techniques such as FEC, silence insertion, interpolation analysis, and decoded signal segment repetition attempt to mitigate the impact of lost audio packets, these conventional techniques are either overly complex and resource-intensive or do not sufficiently eliminate discontinuities in the resulting decoded audio signal.

Accordingly, in at least, one embodiment the client device 104 employs a PLC technique based on pre-decoder packet replication (that is, replication of audio packet content at the input of the decoder). To this end, the client device 104 further includes a stream monitoring module 132 coupled to the network interface 116 and the jitter buffer 118 and further coupled to a packet selector 134 that operates to select and provide audio packets buffered in the jitter buffer 118 to an input 136 of the audio decoder 120. In some embodiments, one or both of the stream monitoring module 132 and the packet selector 134 are implemented at least in part as one or more processors 126 executing software 138 stored in the system memory 130 or other non-transitory computer-readable medium. In other embodiments, one or both of the stream monitoring module 132 and the packet selector 134 are implemented at least in part as hardcoded or programmable logic, or a combination of processor-executed software and programmable/hardcoded logic.

As a general operational overview, the stream monitoring module 132 monitors the received audio stream 114 via the network interface 116 or the jitter buffer 118 to detect lost audio packets. While the audio packet for a corresponding decoding timeslot has been received in time, the stream monitoring module 132 controls the packet selector 134 to access the received audio packet from the jitter buffer 118 and provide the access audio packet to the audio decoder 120 for decoding of its audio content to generate the segment of the decoded audio signal 122 for the corresponding time slot. In contrast, in response to detecting a lost audio packet, when the decoding timeslot for the lost packet is approaching the stream monitoring module 132 controls the packet selector 134 to access the audio packet that was decoded by the audio decoder 120 for the previous decoding timeslot and provide this same audio packet to the input 136 of the audio decoder 120 for repeated decoding so that the resulting decoded segment is used in the decoded audio signal 122 as a replacement for the decoded segment, that would have otherwise been generated by the audio decoder 120 for the lost audio packet had it not been lost.

To illustrate by way of example, assume that the server 102 transmits audio packets 140, 141 and 142 in the audio stream 114 via the network 106 in that order. In this example, audio packets 140 and 142 are successfully received and buffered on time at the client device 104, but audio packet 141 is lost in the network 106. Accordingly, with the audio packet 140 being timely received and buffered, the packet selector 134 provides the audio packet 140 from the jitter buffer 118 to the input 136 of the audio decoder 120 at the corresponding time slot X, whereupon the audio decoder 120 decodes the audio content of the audio packet 140 to generate a segment Y of the decoded audio signal 122. For the next time slot X+1, in response to determining that the next audio packet, audio packet 141, is "lost", the stream monitoring module 132 controls the packet selector 134 to again provide the previously-decoded audio packet, that is, audio packet 140, to the input 136 of the audio decoder 120, whereupon it is again decoded to generate a corresponding segment Y+1 of the decoded audio signal 122. Note that the typical audio synthesis properties exhibited by the audio decoder 120 result in the segment Y+1 being generated by the audio decoder 120 to stitch seamlessly with the segment Y previously generated by the audio decoder 120 from the same audio content, and thus ensuring continuity in the decoded audio signal 122 between segment and segment Y+1 even though both segments were generated from the same input packet (audio packet 140).

Subsequently, as audio packet 142 is timely received, for time slot X+2 the packet selector 134 provides the audio packet 142 to the input 136 of the audio decoder 120, whereupon the audio decoder 120 decodes the audio packet 142 to generate a segment Y+2 for the decoded audio signal 122, which again is stitched seamlessly with the segment Y+2 by the audio decoder 120 due to standard audio synthesis procedures employed by the audio decoder 120.

FIG. 2 illustrates a method 200 representing the pre-decoder packet repetition PLC technique employed by the client device 104 of the system 100 of FIG. 1 in greater detail in accordance with some embodiments. As represented by block 202, during initialization of the client device 104 for processing the audio stream 114, the stream monitoring module 132 sets a number of parameters. One such parameter initialization includes setting a variable REP_PACKET_COUNT representing an ongoing count of number of repeated packets to zero or some other initialization value. Another parameter initialization includes setting a variable THRESHOLD to a specified number representing the maximum number of times an audio packet can be replicated for decoding (or the number of times replicated decoding is performed) in a row before either triggering a fault or a switch to a different PLC process, depending on implementation. Thus, THRESHOLD is, a tuning parameter that can be used to balance between robustness in view of packet losses and audio quality. The value for THRESHOLD thus can be set by a user, by the provider of the audio stream 114, by a provider of the client device 104, and the like.

At block 204, the chant device 104 begins receiving the audio packets of the audio, stream 114 from the server 102 via the network interface 116 and buffering a sliding subset of the audio packets in the jitter buffer 118 (where the maximum size of the current buffered subset is based on the number of entries in the jitter buffer 118). As audio packets are received and buffered, at block 206 the stream monitoring, module 132 monitors the incoming audio packets to determine whether an audio packet has been lost. When no lost packet is detected, at block 208 the stream monitoring module 132 sets or otherwise maintains the variable REP_PACKET_COUNT at zero and for the next decoding time slot the packet selector 134 accesses the buffered audio packet corresponding to that decoding time slot from the jitter buffer 118 and provides the accessed audio packet as the input audio packet to the input 136 of the audio decoder 120 at block 210.

To illustrate, in some implementations each audio packet is assigned a sequence number identifying the position of the corresponding audio packet in an intended playback sequence during the encoding process at the server 102. Consequently, when the stream monitoring module 132 accesses the next audio packet from the jitter buffer 118, the stream monitoring module 132 compares the sequence number of the accessed audio packet with, the expected sequence number. When these numbers match, the stream monitoring module 132 determines that the audio packet for the corresponding decoding time slot is timely. Conversely, if the actual sequence number of the accessed audio packet does not match the expected sequence number, the stream monitoring module 132 identifies the audio packet for the corresponding decoding time slot as lost.

Returning to block 206, if a lost audio packet is detected, then at block 212 the stream monitoring module 132 determines whether the maximum number of packet decoding replications in a row for the same audio packet have been performed by comparing the variable REP_PACKET_COUNT to THRESHOLD. If so (that is, REP_PACKET_COUNT=THRESHOLD), then no further packet decoding repetitions for an interrupted sequence of lost packets is permitted, and thus at block 214 the stream monitoring module 132 either triggers a fault to stop playback of the audio stream (and corresponding video stream if there is one) and to initiate a system performance check. Alternatively, rather than trigger a fault, the client device 104 instead can switch to using a different PLC technique, such as silence insertion, interpolation analysis, and the like. However, if fewer than the maximum packet decoding repetitions in a row have been performed (that is, REP_PACKET_COUNT<THRESHOLD), then at block 216 the stream monitoring module 132 directs the packet selector 134 to access the audio packet that was previously decoded for the most-recent time slot from the jitter buffer 118 and provide this accessed audio packet as the input audio packet to the input 136 of the audio decoder for the upcoming decoding time slot. The stream monitoring module 132 also increments REP_PACKET_COUNT to reflect that a packet decoding replication of this audio packet has been performed.

At block 218, the audio decoder 120 decodes the input audio packet selected via the process represented by blocks 206-216, that is, either the audio packet associated with the current decoding time slot (if this packet was not lost) or the audio packet that was previously decoded for a previous time slot (if the audio packet intended for this time slot was lost). The audio decoder 120 generates a corresponding segment of the decoded audio signal 122 from the encoded audio content of the input audio packet. As explained above, the audio synthesis techniques typically employed by the audio decoder 120 result in the seamless stitching of each generated segment with the next, and thus providing a decoded audio signal 122 free of substantial discontinuities even in the event of one or more lost packets in a row. Concurrent with the decoding of audio packets to generate corresponding segments of the decoded audio signal 122, at block 220 the decoded audio signal 122 can be further processed (e.g., by mixing with other audio signals) and then, converted to one or more analog signals used to drive the one or more speakers 124 to affect, playback of the audio content represented by the audio stream 114.

FIG. 3 illustrates a chart 300 depicting an example operation of the pre-decoder packet repetition PLC process represented by method 200 of FIG. 2. The seven vertical rows of chart 300 represent seven decoding time slots for the audio decoder 120 of the client device 104, identified as time slots A, B, C, D, E, F, and G, with time slot A being the earliest time slot and time, slot G being the latest time slot. Row 310 represents the factions of the server 102 in generating audio packets for each corresponding time slot A-G, row 312 represents the actions of the client device 104 in receiving audio packets from the server 102 for each corresponding time slot, and row 314 represents the actions of the client device in decoding audio packets and providing for playback of the resulting decoded audio signal segments.

As illustrated by row 310, the server generates and transmits audio packets 301, 302, 303, 304, 305, 306, and 307 for time slots A, B, C, D, E, F, and G, respectively. As represented by rows 312 and 314, on the client device side, for time slot A, audio packet 301 is received (without loss or late arrival), buffered, decoded, and the resulting segment of the decoded audio signal played, back per normal operation. Likewise, for time slot B, audio packet 302 is received (without loss or late arrival), buffered, decoded, and the resulting segment of the decoded audio signal played back per normal operation. However, for time slot C, the associated audio packet 303 is lost by the network 106. Accordingly, the stream monitoring module 132 notes the lost status of audio packet 303 and thus directs the packet selector 134 to access the audio packet decoded for the previous time slot B, that is audio packet 302, and to provide this audio packet 302 to the audio decoder 120 for decoding again into a corresponding segment of the decoded audio signal for time, slot C. Thus, the audio content of audio packet 302 is decoded twice to generate two successive segments of the resulting decoded audio signal, once for its associate time slot B and then again to fill in for the lost audio packet 303 for the following time slot C to reconstruct the audio signal for the segments corresponding to time slots B and C.

Thereafter, for time slot D, the associated audio packet 304 is received on time and thus provided for decoding by the audio decoder 120 into a corresponding segment of the decoded audio signal. For the following two time slots E and F, the associate audio packets 305 and 306 are not received on time for decoding in their respective time slots, but instead are received late during the following time slot G. Accordingly, for time slot E, the client device 104 reuses the audio content of audio packet 304 to decode a corresponding segment of the decoded audio signal, and the audio packet 304 is again selected for decoding a third time to generate another segment of the decoded audio signal for time slot F. Then, while all three of audio packets 305, 306, and 307 are received in time for time slot G, audio packets 305 and 306 are associated with earlier time slots and thus are discarded from the jitter buffer 118, and the audio decoder 120 decodes the audio packet 307 to generate a segment of the decoded audio signal corresponding to time slot G.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects, of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below.

It is therefore evident that the particular embodiments disclosed above may be altered or modified and all such variations are considered within the scope of the disclosed subject matter. Accordingly, the protection sought herein is as set forth in the claims below.

What is claimed is:
1. An electronic device comprising:
a network interface configured to receive a stream of audio packets via a network;
a buffer configured to temporarily buffer a subset of audio packets of the stream;

an audio decoder having an input to receive audio packets from the buffer and an output to provide corresponding segments of a decoded audio data stream; and
a stream monitoring processor configured to provide, from the subset in the buffer, an audio packet that was most recently provided to the audio decoder to the input of the audio decoder again for a repeated decoding in place of a decoding of an audio packet that is lost or late responsive to determining that a number of times that the audio packet has been decoded in a row has not exceeded a threshold.

2. The electronic device of claim 1, wherein the stream monitoring processor is configured to increment a count responsive to providing the audio packet that was most recently provided to the audio decoder to the input of the audio decoder again for a repeated decoding.

3. The electronic device of claim 1, wherein the stream monitoring processor is further configured to trigger a fault responsive to the number of times that the audio packet has been decoded in a row has exceeded the threshold.

4. The electronic device of claim 1, wherein the stream monitoring processor is further configured to implement an alternative packet loss concealment process for compensating for an audio packet that is lost or late responsive to the number of times that the audio packet has been decoded in a row has exceeded the threshold.

5. The electronic device of claim 1, wherein the stream monitoring processor is configured to:
for a first audio packet timely received at the electronic device, provide the first audio packet to the audio decoder for decoding into a corresponding first segment of a decoded audio signal for a first time slot; and
for a second audio packet that is late or lost, the second audio packet associated with a second time slot immediately after the first time slot, provide the first audio packet to the audio decoder for decoding into a corresponding second segment of the decoded audio signal for the second time slot.

6. The electronic device of claim 5, wherein the audio decoder is configured to provide for continuity between the corresponding first segment and the corresponding second segment.

7. The electronic device of claim 5, wherein the stream monitoring processor is further configured to:
for a third audio packet that is late or lost, the third audio packet associated with a third time slot immediately after the second time slot, provide the first audio packet to the audio decoder for decoding into a corresponding third segment of the decoded audio signal for the third time slot.

8. The electronic device of claim 7, wherein the audio decoder is configured to provide for continuity between the corresponding second segment and the corresponding third segment.

9. The electronic device of claim 1, wherein the stream of audio packets is generated from audio content generated by a video game application executed at a server connected to the electronic device via the network.

10. A system comprising a server to generate the stream of audio packets and the electronic device of claim 1.

11. A computer-implemented method comprising:
receiving a stream of audio packets from a network;
temporarily buffering a subset of the audio packets;
decoding, at an audio decoder, a first audio packet of the subset to generate a first segment of a decoded audio data stream; and
responsive to detecting that a second audio packet directly following the first audio packet in the stream is lost or late and responsive to determining that a number of times that the first audio packet has been decoded in a row has not exceeded a threshold, decoding, at the audio decoder, the first audio packet again to generate a second segment of the decoded audio data stream, the second segment following the first segment in the decoded audio data stream, and increment a count indicating a number of times that the first audio packet has been decoded in a row.

12. The method of claim 11, further comprising:
responsive to detecting that a third audio packet directly following the second audio packet in the stream is lost or late, decoding, at the audio decoder, the first audio packet a third time to generate a third segment of the decoded audio data stream, the third segment following the second segment in the decoded audio data stream, and incrementing the count.

13. The method of claim 11, wherein decoding the first audio packet again is further responsive to determining that the count has not exceeded the threshold.

14. The method of claim 13, further comprising:
triggering a fault responsive to determining that the count has exceeded the threshold.

15. The method of claim 13, further comprising:
implementing an alternative packet loss concealment process for compensating an audio packet being lost or late responsive to determining that the count has exceeded the threshold.

16. The method of claim 11, wherein the audio decoder generates the second segment to have continuity with the first segment.

17. The method of claim 11, wherein the stream of audio packets is generated from audio content generated by a video game application executed at a server.

18. An electronic device comprising a buffer to buffer audio packets and a decoder to decode audio packets, the electronic device configured to perform the method of claim 11.

19. A non-transitory computer-readable medium storing a set of executable instructions configured to manipulate a processor to:
decode a first audio packet of a temporarily buffered subset of audio packets of a stream received via a network to generate a first segment of a decoded audio signal; and
responsive to detecting that a second audio packet directly following the first audio packet in the stream is lost or late and responsive to determining that a number of times that the first audio packet has been decoded in a row has not exceeded a threshold, decode the first audio packet again to generate a second segment of the decoded audio signal, the second segment following the first segment in the decoded audio signal and having continuity with the first segment, and increment a count indicating a number of times that the first audio packet has been decoded in a row.

20. The non-transitory computer-readable medium of claim 19, wherein the executable instructions to manipulate the processor to decode the first audio packet again comprise instructions to decode the first audio packet further responsive to determining that the count has not exceeded the threshold.

* * * * *